(12) United States Patent
Jordan, Jr.

(10) Patent No.: US 7,748,160 B1
(45) Date of Patent: Jul. 6, 2010

(54) PERIMETER PEST CONTROL SYSTEM FOR USE ON BRICK STRUCTURES

(76) Inventor: John Jeremiah Jordan, Jr., 2349 Walker Dr., Lawrenceville, GA (US) 30043

( * ) Notice: Subject to any disclaimer, the term of this patent is extended or adjusted under 35 U.S.C. 154(b) by 0 days.

(21) Appl. No.: 11/551,691

(22) Filed: Oct. 20, 2006

Related U.S. Application Data

(63) Continuation-in-part of application No. 11/460,539, filed on Jul. 27, 2006, now Pat. No. 7,464,499.

(51) Int. Cl.
*A01M 1/20* (2006.01)

(52) U.S. Cl. .................................. 43/132.1; 43/124

(58) Field of Classification Search ............... 43/124, 43/132.1
See application file for complete search history.

(56) References Cited

U.S. PATENT DOCUMENTS

| | | | | |
|---|---|---|---|---|
| 2,981,025 | A * | 4/1961 | Woodson | 43/124 |
| 3,209,485 | A * | 10/1965 | Griffin | 43/124 |
| 3,330,062 | A * | 7/1967 | Carter | 43/124 |
| 3,782,026 | A * | 1/1974 | Bridges et al. | 43/124 |
| 4,028,841 | A * | 6/1977 | Lundwall | 43/124 |
| 4,648,202 | A * | 3/1987 | Renth | 43/132.1 |
| 4,823,505 | A * | 4/1989 | Jackson | 43/124 |
| 4,893,434 | A * | 1/1990 | Knipp et al. | 43/124 |
| 4,944,110 | A * | 7/1990 | Sims | 43/124 |
| 5,007,197 | A * | 4/1991 | Barbett | 43/124 |
| 5,058,312 | A * | 10/1991 | Jackson | 43/124 |
| 5,231,796 | A * | 8/1993 | Sims | 43/124 |
| 5,309,669 | A * | 5/1994 | Jackson | 43/124 |
| 5,361,533 | A * | 11/1994 | Pepper | 43/124 |
| 6,094,857 | A * | 8/2000 | Kennedy et al. | 43/132.1 |
| 6,708,444 | B2 * | 3/2004 | Aesch, Jr. | 43/124 |
| 6,840,004 | B1 * | 1/2005 | Allen | 43/124 |
| 6,877,272 | B2 * | 4/2005 | Hoshall | 43/132.1 |
| 7,086,197 | B1 * | 8/2006 | Gronewald | 43/132.1 |
| 7,127,846 | B1 * | 10/2006 | Disler | 43/132.1 |

* cited by examiner

*Primary Examiner*—Christopher P Ellis
(74) *Attorney, Agent, or Firm*—Sanford J. Asman

(57) ABSTRACT

An elongated tubular pesticide dispersion tube is fixed in place in the outer brick wall of a building having an inner structural wall. The dispersion tube can be installed in the mortar between courses of brick during construction or added to an existing structure by drilling a hole through the outer brick wall. A plug is used to seal the dispersion tube when the appliance is not actively being used as to inject a pesticide, an insecticide, or a chemical through the dispersion tube and into the gap between the outer brick wall and the inner structural wall. The method of using the novel appliance to inject a pesticide, an insecticide, or a chemical product into the gap between the outer brick wall and the inner structural wall, thereby sealing the area formed between them is also described.

12 Claims, 4 Drawing Sheets

PERIMETER PEST CONTROL SYSTEM FOR USE ON BRICK STRUCTURES

CROSS-REFERENCE TO RELATED APPLICATION

The present application is a continuation-in-part of U.S. patent application Ser. No. 11/460,539 entitled PERIMETER PEST CONTROL SYSTEM FILED by John J. Jordan on Jul. 27, 2006.

BACKGROUND OF THE INVENTION

The present invention relates to an appliance for use in injecting a pesticide or a termiticide between the outer brick wall and the inner structural wall of brick structures. In particular, the present invention is intended to be used to provide a means for facilitating the injection of chemical pesticides between the inner and outer portions of the exterior wall system of a brick structure, thereby providing a perimeter pest control system which extends around the periphery of the structure.

In the past there have been efforts to provide pesticide treatment to protect structures at the time that they are constructed. While it has been common practice in the construction of new buildings to pre-treat the fill or soil area which is to underlie the foundation with a termiticide, the initial termite barrier does not last indefinitely, so there is a need to supplement this barrier during the life of the building by providing an efficient and inexpensive means at the points where termites or other insects can gain access to wooden structural members. While termites do not bore holes through brick and mortar, they can gain entry into the areas where there are cracks in the foundation or where wood is used in the construction of the building by forming earthen tunnels from ground level over the surfaces of concrete foundations, slabs, and walls. In buildings which have a brick exterior, the foundation is typically formed so as to have a stepped portion on which the lowest course of brick is laid. The stepped portion extends out from, and is lower than, the remaining portion of the foundation on which a wood wall system is supported, leaving a space between the outer brick wall and the inner exterior wall of the structure.

Once termites gain entry to the gap between the exterior brick wall and the inner wall, they are able to build tunnels in the tiny spaces between the walls and the surfacing material, and their tunneling activity will not be detected because it is behind the exterior brick wall. Thus, while the exterior brick wall will prevent termites or other insects from gaining access through them, the lack of a seal between the exterior portion of the internal structural wall and the interior portion of the exterior brick wall provides a path through which termites can enter the structure from behind the exterior brick wall.

This situation can be made worse if landscaping activities decrease the vertical space between the ground and the upper portion of the foundation wall following construction which make it even easier for termites and other insects to gain access by climbing up the edges of a foundation slab and between the structural walls and the exterior brick wall without being detected until after severe damage has been done to wooden structural members of the building.

Prior methods for preventing termites from entering between the structural walls and the exterior brick wall involve saturating the soil adjacent to the perimeter of the structure with pesticides and termiticide at the point of termite entry. This is accomplished by trenching or rodding. In the first of these methods, a trench is dug around the perimeter and filled with termiticide, e.g., at the rate of about four gallons of termiticide per linear foot of trench. In the other method, termiticide is injected through a hollow rod jammed into the soil and against the foundation about every six inches or so. Usually the soil adjacent the foundation is relatively dry. Since dry soil does not absorb liquids easily, it is not uncommon for termiticide applied in this manner to drain away very quickly, thereby making it ineffective at the point of termite entry, and, instead, creating an environmental detriment to the surrounding soil. Further, these methods are quite labor intensive, so they are costly to use. Thus, there has been an ongoing need for an efficient, labor-saving termiticide delivery system for providing an effective perimeter pest control system to create a barrier between the exterior brick wall of a building and its foundation and exterior structural walls, whereby the area between them can be easily treated on a periodic basis.

While a number of fluid distribution systems for pesticides or termiticides comprised of conduit capable of emitting pesticides or termiticides through apertures or valves have been developed for incorporation in or under a building foundation, these prior systems are typically quite elaborate in construction, requiring extensive modification of traditional and conventional building methods, expensive pumps and reservoirs, and substantial increases in building costs. Such issues have been previously noted, for example, in U.S. Pat. No. 3,513,586 to Meyer et al. which discloses and teaches a distribution system comprising tube means disposed within a building footer constructed of conventional concrete building blocks, requiring additional support members and plate members, among other things, that but for the distribution system, would not be required as part of the footer.

U.S. Pat. No. 3,209,485 to Griffin discloses a pesticide distribution system comprised of multiple, independent, branched circuits, intended to be installed within and under a foundation at the time of construction. The system comprises many parts, and its installation requires multiple steps at different stages of construction of the building.

U.S. Pat. No. 3,602,248 to Peacock discloses a distribution system comprised of a plurality of parallel connected pipe branches, each branch thereof short enough so that fluid pressure is maintained along the entire piping, with at least two inlets into each branch. Each branch requires a closure fitting at the end opposite the inlet end. Multiple pumps are required to maintain uniform pressure in the branch lines.

There are also a number of related systems for distributing pesticide within the walls of buildings. In U.S. Pat. No. 3,676,949 of Ramsey, pipes with emitter nozzles pass through the studs of the walls with a nozzle disposed between each set of studs. In U.S. Pat. No. 3,782,026 of Bridges et al., pipes extend within the walls or, alternatively, beneath baseboard moldings on the interior walls, permitting injection of insecticide gas within the walls. In U.S. Pat. No. 4,028,841 to Lundwall an insecticide storage and pressurizing system is installed in the attic, and perforated pipes carry pest control fluid into the building walls, while U.S. Pat. No. 4,742,641 to Cretti describes a built-in reservoir which is installed within a building wall from which pesticide is distributed whenever the pump is operated (which can be done by a timing device for injecting predetermined amounts at predetermined spaced intervals).

U.S. Pat. No. 3,330,062 to Carter is another pest control system utilizing pipes installed through holes drilled through the wall studs of a building with the pipes requiring threaded caps at their distal ends. U.S. Pat. No. 4,944,110 to Sims relates to a method for applying pesticide into the concealed areas of a building, by injecting pressurized chemicals through perforated preinstalled tubing. U.S. Pat. No. 5,347,749 to Chitwood et al. discloses a system for reapplication of termiticide to the fill dirt underlying the foundation slab of a building at potential termite entry points: junction of foundation block with slab, and openings in the slab for penetration of bundles of utility connections.

While none of the foregoing patents teaches or discloses a system adapted to deliver a termiticide barrier to the exterior walls of a building underneath its surface coating or siding materials, an effort to disclose such a system was made in U.S. Pat. No. 5,819,466 to Aesch, et al., in which a peripheral termiticide delivery system using flexible apertured tubing was described. Nevertheless, that system was designed to simply saturate the exterior foundation walls of a structure, with the treatment going down to the soil, rather than being retrofitted to existing structures having an exterior brick wall while providing a convenient and efficient means for applying pesticide.

U.S. Pat. No. 6,301,849 which issued Roth describes a flashing article used to seal out and drain away moisture from a stucco coated exterior wall surface, but it does not describe a system which can be used to seal the exposed area between the structural and exterior walls in lapped "plank" type of construction while providing a means for introducing pesticides into such exposed areas.

SUMMARY OF THE INVENTION

In that no combination of the known prior art devices provides a means for providing an efficient, easily installed and easily used means for pesticide treatment for structures having exterior brick walls, the need for such a system is met by the present invention.

In particular, the present invention is an elongated tubular article designed to be installed in, and extend through, an exterior brick wall of a structure, whereby the appliance provides a means for communication from outside of the brick wall to the gap formed between the inside of the brick wall and the outer surface of the interior structural wall.

In various embodiments, the appliance of the present invention includes, as a first component, an elongated dispersion tube, having a length somewhat longer than the width of the brick used to form the outer wall. The dispersion tube has an interior opening, or lumen, which provides direct communication therethrough, and which has an inside diameter sized to receive a termiticide or pesticide injection nozzle.

The appliance further includes a second component which is an elongated plug, which is sized to fit within and fill the opening in the dispersion tube, so that when the appliance is installed during the construction of a brick wall, the opening in the dispersion tube, being filled with the plug, does not get clogged with mortar. Similarly, in the embodiments which are designed for retrofit applications, the presence of the plug component during the installation of the appliance prevents adhesive, caulk, or debris from entering the opening in the dispersion tube component.

When the appliance is in use, the plug component prevents water or insects from gaining ingress, yet it is easily removed to allow treatment, after which it is easily replaced.

DETAILED DESCRIPTION OF THE PREFERRED EMBODIMENTS

Figure 1:
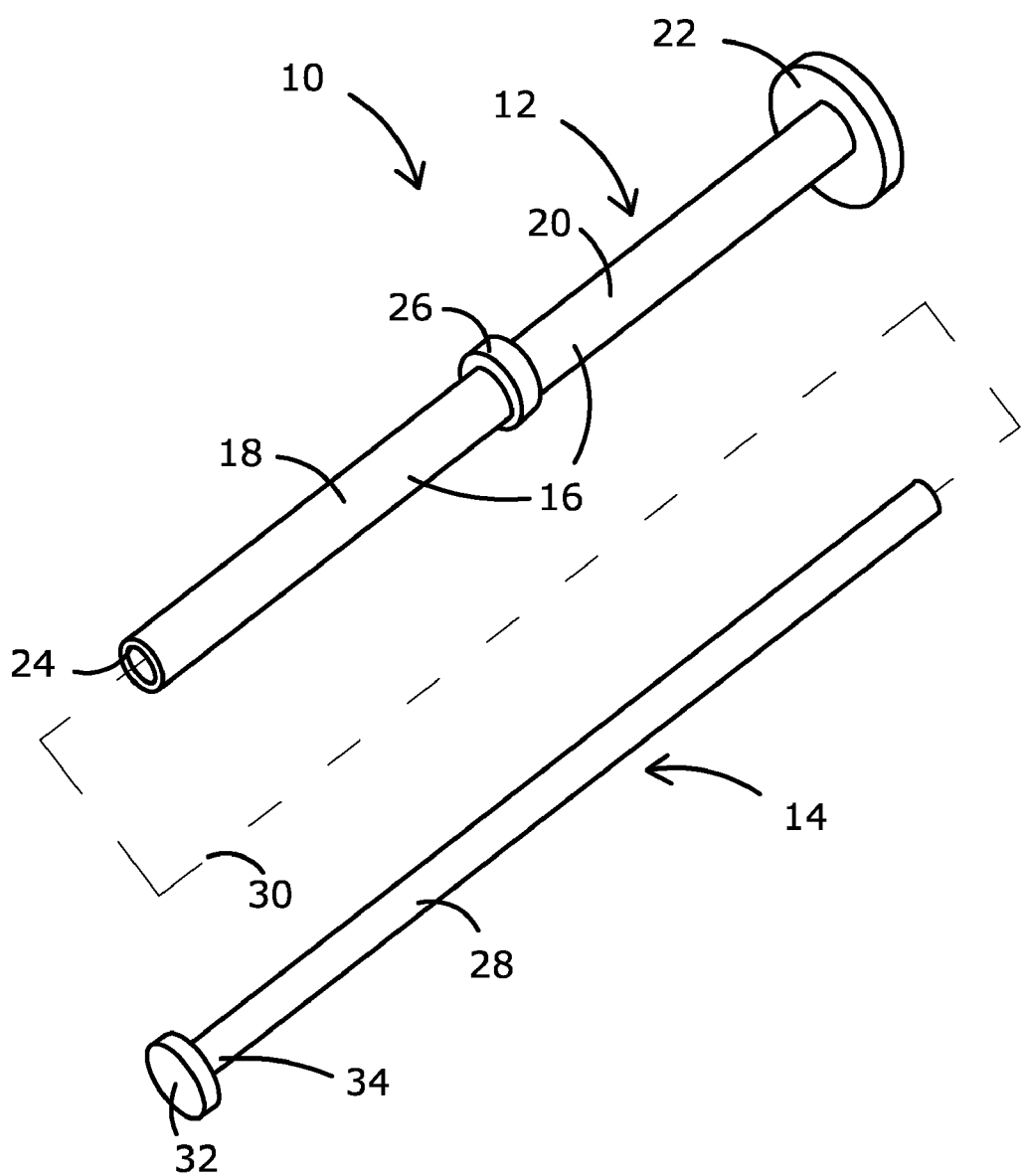
FIG. 1 is a perspective view of the components which form the preferred embodiment of the present invention, including the dispersion tube and plug components.

Referring to FIG. 1, the present invention relates to an apparatus 10 designed to be used as a pesticide or termiticide application appliance which facilitates injection of a termiticide or insecticide between the inner and outer walls of brick structures. As shown, the appliance 10 comprises two components, namely a dispersion tube 12 and a full length plug 14, which are each preferably molded of a plastic material, such as polyvinylchloride ("PVC"). As will be explained herein, the dispersion tube 12 is formed such that it has an overall length which is preferably chosen to be somewhat longer than the width of the brick used to form the outer wall of the structure. In that standard construction brick has a width of about 3½ inches, the dispersion tube component 12 of the preferred embodiment has an overall length of about 3⅞ inches.

With continued reference to FIG. 1, the appliance 12 has an elongated barrel 16 which has a proximal portion 18 and a distal portion 20. An annular flange 22 is formed at the distal end of the distal portion 20 of the barrel 16, and an opening 24 is formed through the entire length of the barrel 16 as well as through the flange 22, thereby permitting open communication through the entire length of the dispersion tube 12, including both the barrel 16 and the flange 22. A locking ridge or collar 26 having an outer diameter somewhat greater than the outer diameter of the proximal and distal portions 18, 20 of the barrel 16 is preferably formed somewhat near the middle of the barrel 16, separating the proximal and distal portions 18, 20.

As set forth above, and as will be explained further hereinafter, in the preferred embodiment of the invention the overall length of the barrel 16 is chosen to be somewhat longer than the width of a standard construction brick (which is about 3½ inches wide). Thus, a length of about 3.688 inches for the barrel 16, plus another 0.188 inches for the thickness of the flange, giving the dispersion tube 12 an overall length of about 3⅞ inches, has been chosen for use in the preferred embodiment of the invention, although other lengths would be used for brick walls constructed of brick having different thicknesses. The flange 22 preferably has an outside diameter of about 1 inch, and the opening 24 which extends through the length of the dispersion tube 12 and the flange 22 preferably has a diameter of about 3/16 inch in order to prevent binding when a termicide (or insecticide) injection nozzel having an outside diameter of about one-eighth inch is inserted therein. The collar 26 of the preferred embodiment has an outer diameter of about 7/16 inch, and the collar preferably extends about one-quarter inch in length along the barrel 16.

With continued reference to FIG. 1, the appliance 10 further comprises a second component which is a full length plug 14, also preferably molded from a plastic material such as PVC. The plug 14 comprises a barrel 28 having an outer diameter of about one-eighth inch, which allows it to easily slide through the opening 24 in the dispersion tube 12 (as indicated by the dashed line 30). A button 32 is formed at the proximal end 34 of the plug 14. The button 32 has a diameter of about ⅜ inch in the preferred embodiment of the invention whereby it will limit the travel of the plug 14 into the opening 24 in the dispersion tube 12. The barrel 28 has a length chosen to be somewhat longer than the overall length of the dispersion tube 12. In the preferred embodiment illustrated in FIG. 1, the overall length of the dispersion tube is about 3⅞ inches, so the length chosen for the barrel 28 is about 4 inches, plus an additional one-quarter inch for the thickness of the button 32, thereby giving the plug 14 an overall length of about 4¼ inches.

Figure 2:
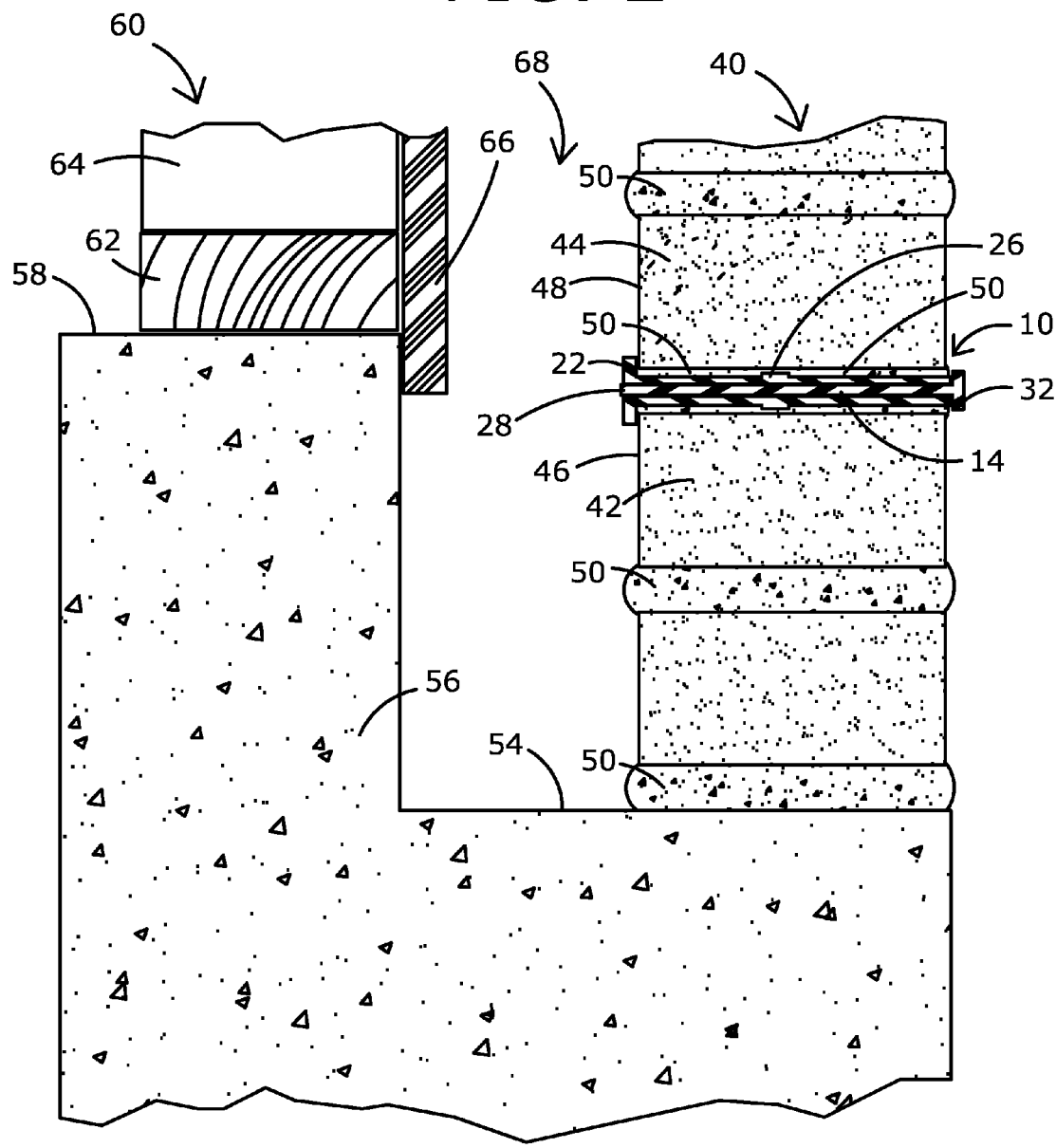
FIG. 2 is a side, cross-sectional view of the invention of FIG. 1 illustrating the manner in which the appliance appears when it is part of a structure, and this view corresponds to the view taken along line 2-2 of FIG. 3.
Figure 3:
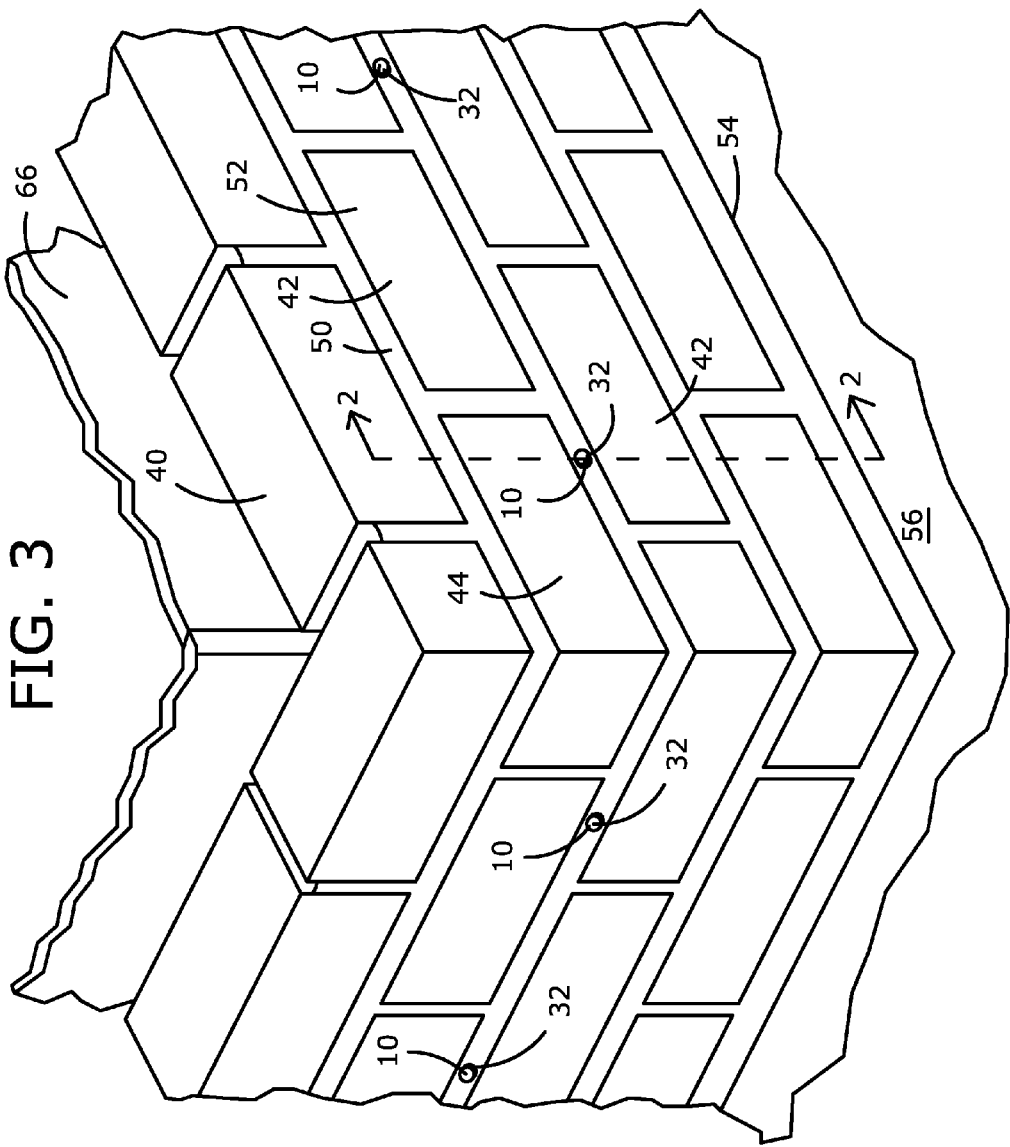

Referring now to FIGS. 2 and 3, the assembled appliance 10 (i.e., having the plug 14 inserted into the opening 24 in the dispersion tube 12) is shown in place in a brick wall 40. Specifically, FIG. 2 illustrates the placement of an assembled appliance 10 (shown in cross-section), with the flange 22 at the distal end of the dispersion tube 12 adjacent the rear of bricks 42, 44. As illustrated, the 1 inch diameter of the flange 22 allows it to overlap the rear surfaces 46, 48 of the bricks 42, 44, respectively. As the mortar 50 between bricks is generally applied to a thickness of about one-half inch thickness, the flange 22 extends about one-quarter inch over the rear surfaces 46, 48 of each of the bricks 42, 44.

As is also illustrated in FIG. 2, the design of the collar 26 (i.e., the fact that it extends radially outward from the barrel 16,) helps to lock the dispersion tube 12 in place within the mortar 50 separating and binding bricks 42, 44. The flange 22 prevents the dispersion tube 12 from being pulled toward the external surface 52 of the wall 40, and it helps prevent mortar 50 from entering the opening 24 when the appliance is initially installed (i.e., before the wet mortar has set). The collar 26 also prevents movement of the dispersion tube 12 once the mortar 50 has set.

As illustrated, the brick wall 40 sits on a step 54 formed as part of foundation 56. While the step 54 supports the exterior brick wall 40, an upper surface 58 of the foundation 56 supports the inner wall 60 of the structure. The inner wall 60 includes a plate 62 which lies on, and is preferably attached to, the upper surface 58 of the foundation. Vertical studs 64 are attached to, and extend upward from, the plate 62. Typically, a layer of insulation 66 is attached to the outer portion of the interior wall 60, leaving a gap 68 between the outer surface of the inner wall 60 (which may, optionally, include a layer of "wrap", not shown) and the rear surface of the exterior brick wall 40.

In the preferred embodiment of the invention, the appliances 10 are spaced about 12 inches apart in the mortar 50, preferably above the second course of bricks so as to insure that they will be readily accessible after the surrounding area has been filled and landscaped. In addition, by placing the appliances 10 above ground level, the likelihood of water intrusion through the dispersion tubes 12 is minimized.

In use, the plugs 14 are readily removable from the dispersion tubes 12, exposing the openings 24, into which a pesticide (or termiticide), can be injected periodically, as desired, to insure that the gap 68 is properly treated. It has been found that a preferred method for treating the structure involves the use of a pesticide foam (or a termiticide foam) which is injected through the dispersion tubes 12, and which then expands in the gap 68 after which the plugs 14 are reinserted.

Figure 4:
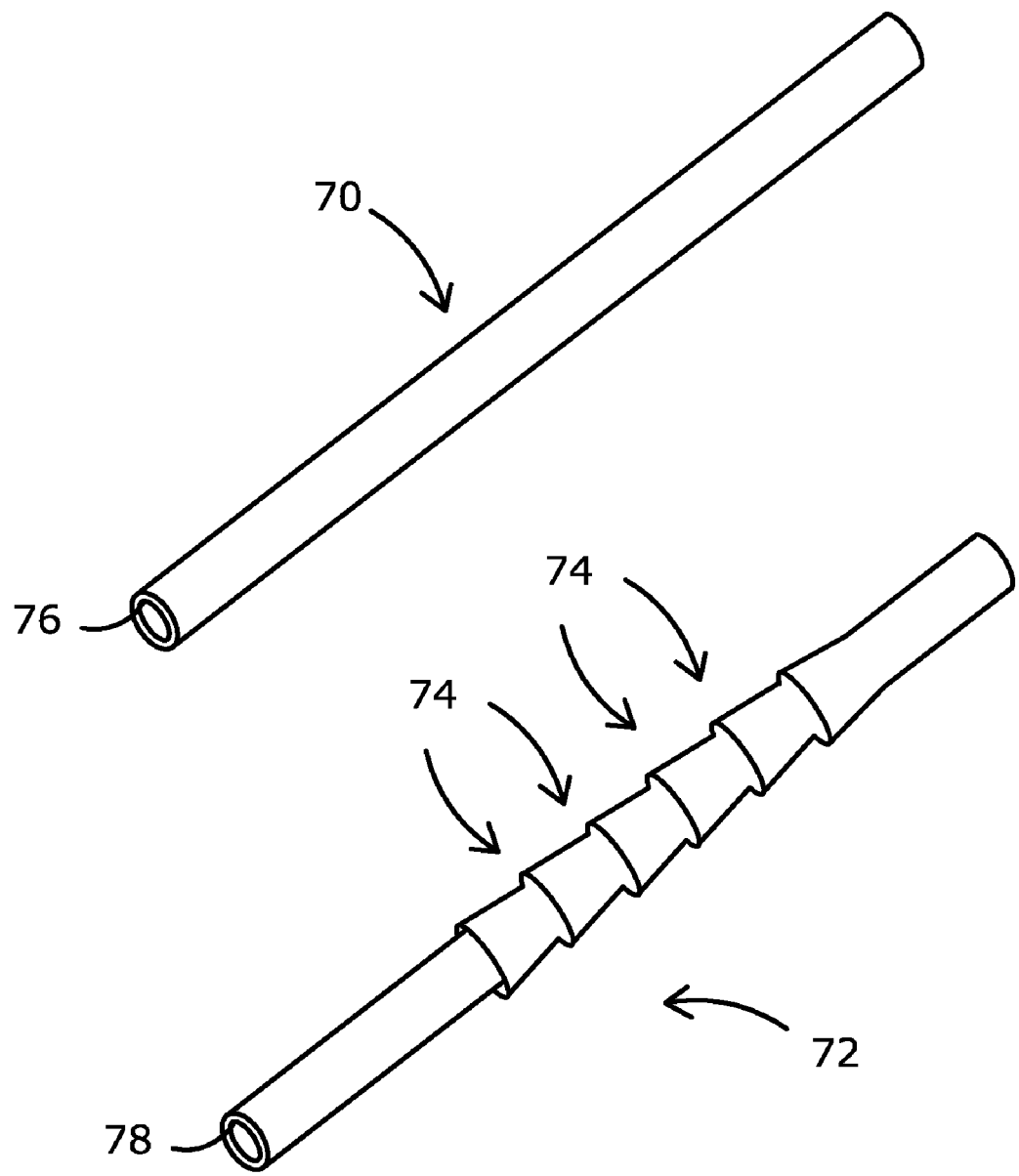
FIG. 4 is a perspective view of additional embodiments of dispersion tube components which are designed for use when the present invention is used in a retrofit application.

The present invention can be installed on structures having either slab or basement foundations, and it is intended to allow a pest control service company to periodically apply a uniform pesticide or termiticide barrier around the exterior of a home or other structure in an area which protects the pesticide or termiticide against degradation from exposure to the elements. It also minimizes the amount of pesticide that would come in contact with the exterior of the building. As will be understood by those skilled in the art, the invention would typically be installed during construction of a new structure. However, in other embodiments of the invention, alternative embodiments 70, 72 of the dispersion tube, as shown in FIG. 4, are used, in order to allow the invention to be used to retrofit existing structures by drilling holes through the outer wall (preferably through the mortar, rather than the bricks, for esthetic reasons). As shown, the alternative embodiments 70, 72, which are intended for retrofit applications, do not include a flange at their distal ends. Also, as shown, the embodiment 70 has a relatively smooth outer diameter, while the embodiment 72 includes a series of ridges 74. In order to use either of the embodiments 70, 72, a series of holes are bored through the outer brick wall of the structure, preferably through the mortar between the second and third courses of bricks. Then, the dispersion tubes 70 (or 72) are pressed into the holes, typically with an adhesive or caulk applied to them (and with a plug 12 inside to prevent clogging of their internal openings 76 (or 78). As will be obvious, the absence of the flange 22 used in dispersion tube 12, permits the dispersion tubes 70, 72 to be pressed into the bored holes.

In addition to treating the gap 68 (See, FIG. 2), the appliance of the present invention can also be placed at the four corners of windows and at the upper corners of door frames installed in the brick wall, as these areas are prone to insect and termite attack.

The present invention can be used as a stand-alone pest control treatment, or it can be used in conjunction with other traditional pest or termite treatment products and protocols. Its design allows for the application of pesticide or termiticide without requiring entry into the home, so it is not necessary to schedule treatments only when someone can be present to provide access.

Various pesticides and termiticides can be used with the present invention. One which has been used in a foam supplied through the use of a portable foam generator of the type produced by NoHowe Product Development Ltd. of Midhurst Ontario and described in U.S. Pat. No. 6,755,400 to Howe, using their ProFoam Platinum product, has been Termidor, although other types of pesticide or termiticides, such as those made by Dupont or FMC, could also be used in any suitable foam carrier.

While there are industry distinctions between "pesticides" and "termiticides" those skilled in the art will recognize that the present invention, described herein, can be used with any pesticide or termiticide which can be injected through it in a foam carrier as described above. As the efficacy of the treatment will be determined by the specific pesticide or termiticide which is used, the present invention should be regarded as an appliance which makes such treatment possible. Accordingly, nothing in the descriptions set forth above should be regarded as limiting the use of the present invention to either a pesticide or a termiticide, or to any particular pesticide or termiticide. Thus, the appliance of the present invention could be used to inject various chemicals, including those used to treat mold or mildew.

While the invention has been described in connection with specific embodiments and applications, the inventors do not intend to restrict the description to the examples shown. Persons skilled in the art will recognize that the above methods may be modified or changed without departing from the general scope of this description. The inventors also intend to include all such modifications and alterations in so far as they come within the scope of the appended claims or the equivalents thereof.

I claim:

1. An appliance for use in treating the gap which exists between the rear side of a brick outer wall and the outer surface of the interior structural wall of a brick walled structure comprising:
   (a) a first component having a substantially straight elongated tubular structure, said elongated tubular structure having a lumen which extends through the entire length of said first component, said lumen having a size and configuration adapted to receive a separate, removable injection nozzle, said separate injection nozzle being adapted to be removably inserted into said lumen to inject therethrough a chemical substance selected from the group consisting of an insecticide, a termiticide, and a chemical treatment product through said lumen, whereby said chemical substance will pass into said first component from a proximal portion thereof, through said first component, exiting said lumen from a distal portion thereof, said first component being permanently installable in said brick outer wall either during construction or thereafter, the overall length of said first tubular member being substantially the same as the thickness of said brick outer wall;
   (b) a second component comprising a substantially solid plug having a barrel whose outer diameter is somewhat less than the diameter of said lumen in said first component, whereby said barrel is adapted to slide into said lumen from said proximal portion when said separate injection nozzle is removed from said lumen, the length of said barrel being no less than the length of said lumen, whereby said barrel can completely fill said lumen, said second component further comprising means for preventing said second component from sliding totally within said lumen, said means for preventing also providing a means for withdrawing said plug from said lumen, said plug being removed from said lumen when said appliance is used to inject chemical within said gap and said plug being reinserted into said lumen only when said separate injection nozzle has been removed from said lumen; and
   (c) means for affixing said first component in a brick wall of a structure of the type having an outer brick wall and an inner structural wall with a gap therebetween, the length of said first component being at least as long as the thickness of said outer brick wall, whereby said appliance is adapted to allow the injection of said chemical substance into said gap upon removal of said plug, whereby said second component is wholly removed and separated from said lumen during treatment when said chemical substance is injected into said proximal end of said lumen, whereby said chemical substance will pass through said lumen, exiting said lumen from said distal end whereby said chemical substance will pass through said brick outer wall and be injected into said gap between said brick outer wall and said inner structural wall, and whereby said second component is replaced in said lumen following treatment.

2. The appliance of claim 1 wherein said lumen has a substantially circular cross-section.

3. The appliance of claim 2 wherein said plug portion of said second component has a length somewhat longer than the length of said lumen.

4. The appliance of claim 3 wherein said elongated first component has a length which is selected to be at least as long as the width of the brick used to form said brick wall.

5. The appliance of claim 4 wherein said first component is made of a plastic material.

6. The appliance of claim 5 wherein said second component is made of a plastic material.

7. The appliance of claim 6 wherein said plastic material is polyvinylchloride.

8. The appliance of claim 1 wherein said first component includes means for retaining said first component in place during construction of said brick wall.

9. The appliance of claim 8 wherein said means for retaining includes a collar formed on the outer periphery of said first component, whereby said first component can be placed in a layer of mortar between courses of brick during construction of said brick wall.

10. The appliance of claim 9 further comprising a flange formed on one end of said first component, said flange being substantially round, said flange having a diameter which exceeds the thickness of the mortar used between courses in the construction of said brick wall, said flange being placed on the interior side of said brick wall, whereby said flange will aid in preventing movement of said first component during construction of said brick wall while also assisting in preventing mortar from entering said lumen.

11. The appliance of claim 10 wherein the thickness of said mortar is about 0.5 inches and the diameter of said flange is about 1 inch.

12. The appliance of claim 8 wherein said means for retaining includes ridges formed on the outer periphery of said first component, whereby said first component can be pushed into a opening bored through said brick wall after construction and said ridges assist in retaining said first component in place thereafter.

* * * * *